June 1, 1954     P. H. KARLSSON     2,680,008
PELLET CELLS IN ROTARY REGENERATIVE HEAT EXCHANGER
Filed Nov. 28, 1950     2 Sheets-Sheet 1
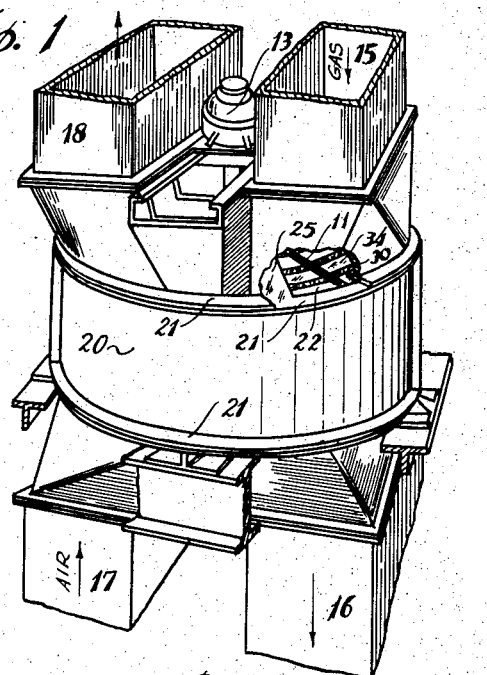
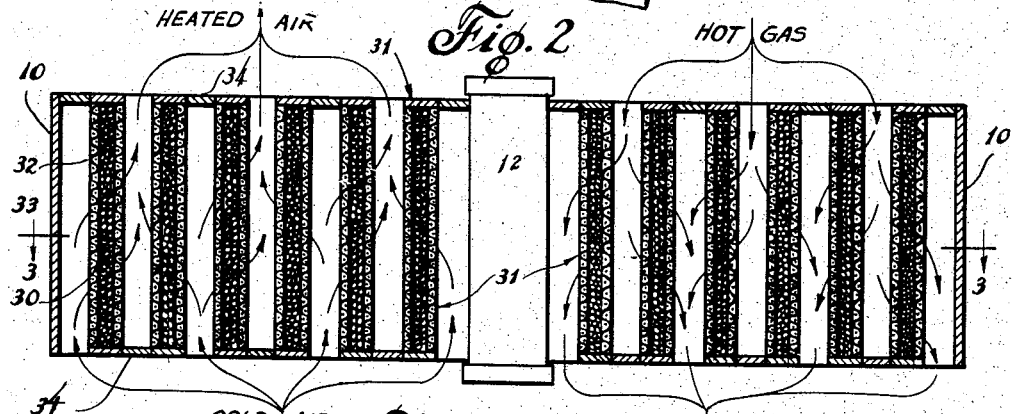
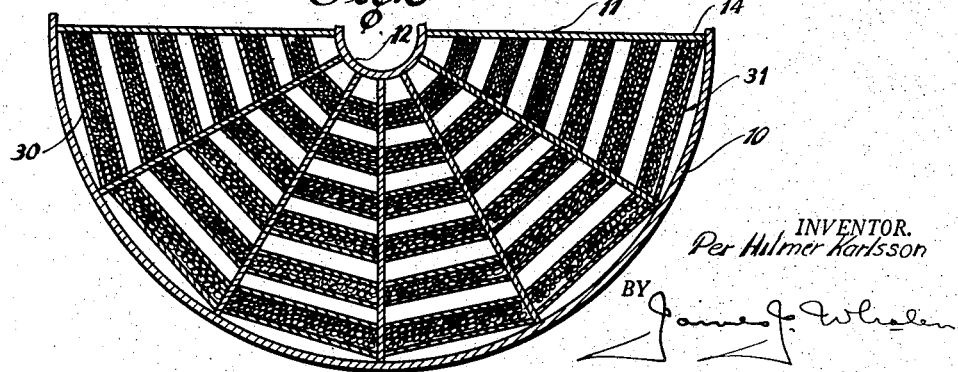
INVENTOR.
Per Hilmer Karlsson
BY
ATTORNEY June 1, 1954     P. H. KARLSSON     2,680,008
PELLET CELLS IN ROTARY REGENERATIVE HEAT EXCHANGER
Filed Nov. 28, 1950     2 Sheets-Sheet 2
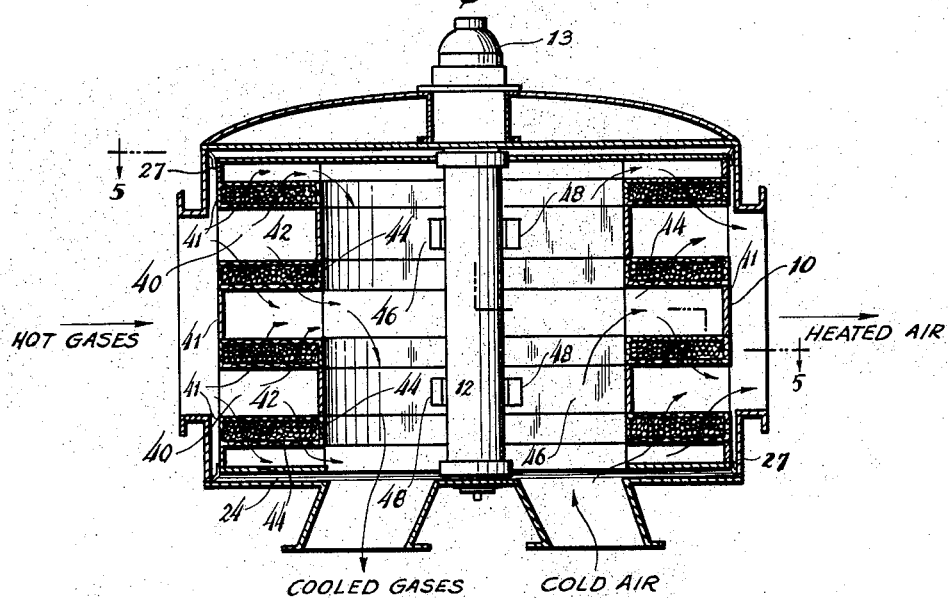
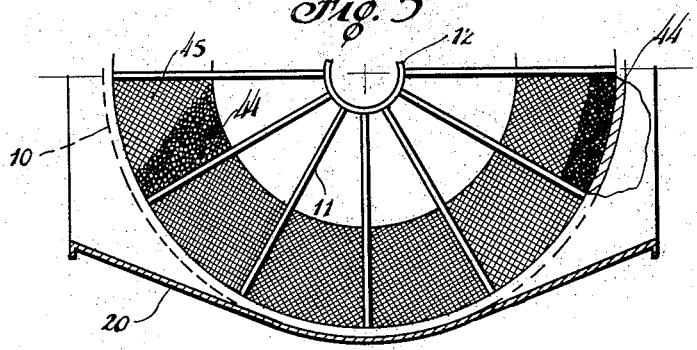
INVENTOR.
Per Hilmer Karlsson
BY
ATTORNEY Patented June 1, 1954

2,680,008

UNITED STATES PATENT OFFICE 2,680,008

PELLET CELLS IN ROTARY REGENERATIVE HEAT EXCHANGER

Per Hilmer Karlsson, Wellsville, N. Y., assignor to The Air Preheater Corporation, New York, N. Y.

Application December 28, 1950, Serial No. 203,191

3 Claims. (Cl. 257—6)

The present invention relates to an improved arrangement of regenerative material in the rotor of an air preheater or similar apparatus.

In a rotary air heater of the Ljungstrom type a cylindrical rotor has compartments carrying regenerative material which as the rotor turns is first exposed to heating gases and then disposed in the air passage to impart the absorbed heat to the air. The rotor is surrounded by a housing having end or sector plates formed with openings to provide for the flow of gas and air. The present invention contemplates the utilization of discrete material in pebble or pellet form as the heat transfer material or alternatively the utilization of the rotary type apparatus for the regeneration by flow of gases thereover of material used in catalytic processes etc.

The invention will be best understood upon consideration of the following detailed description of illustrative embodiments thereof when read in conjunction with the accompanying drawings in which:

Figure 1 is a perspective view of a rotary regenerative air preheater provided with a rotor carrying regenerative heat transfer material arranged in accordance with the present invention.

Figure 2 is a sectional view on an enlarged scale of the rotor illustrating the arrangement of the improved form of heat transfer material in the rotor compartments.

Figure 3 is a sectional view as viewed on line 3—3 in Figure 2 of part of the rotor embracing several complete compartments and shows disposition of the regenerative heat transfer material in the compartments.

Figures 4 and 5 are elevational and sectional views illustrating another manner of arranging the heat transfer material in the rotor.

In Figs. 1 to 3, the numeral 10 designates the cylindrical shell of a rotor divided into sector shaped compartments by radial partitions 11 connecting it with the rotor post 12 which is driven by a motor and reduction gearing 13 to turn the rotor slowly about its axis. The rotor compartments contain regenerative heat transfer material which first absorbs heat from hot gases entering the preheater through a duct 15 from a boiler or other source to be discharged after passing over the heat transfer material through an outlet duct 16. As the rotor turns slowly about its axis, the heated material 14 is moved into the streams of air admitted through the duct 17. After passing over the material 14 and absorbing heat therefrom the stream of air is conveyed to the boiler furnace or other place of use through duct 18.

A housing 20 enclosing the rotor 10 is provided at either end opposite the latter with end or sector plates 21 which are apertured as at 22 in alignment with the ducts 15—18 to admit and discharge streams of gas and air flowing through the preheater. In order that the streams of gas and air may not commingle, a portion of the rotor at least equal to but usually greater in circumferential extent than one rotor compartment must be isolated or blocked off between the gas and air passages. As is well understood, radial seals are provided in cooperative relation between the radial partitions 11 and the sector plates 21 whose imperforate portions 25 must be at least slightly greater than the width of the compartments in the rotor. In order that the streams of gas and air may not by-pass the heat transfer surface 14 by flowing in the annular clearance space between the rotor shell 10 and the housing 20 it is customary to also provide circumferential seals which wipe against the sector plates 21 or allied parts.

In accordance with the present invention the conventional metallic heat transfer plates that are ordinarily mounted in spaced relation to form passages therebetween for the flow of heat axially of the rotor are replaced by pebble-like bodies or pellets which may be of metal, ceramics or other composition depending upon conditions to be met. The use to which they are to be put determines also the size of the pebbles or pellets, as for example, from approximately ⅛" to ½" in diameter. Masses of these pellets 30 are carried in the various compartments into which the rotor 10 is divided by the partitions 11. The pellets are supported in cartridge-like containers or cells designated as a whole by the numeral 31 which have foraminous or perforate side walls to permit the flow of gases therethrough into contact with and through the mass of pellets 30. These cartridge-like cells 31 are supported in radially spaced relation in the rotor compartments and the spaces therebetween are closed alternately at the top and at the bottom of the rotor by imperforate plate members 34 bridging the intervals between adjacent cartridge masses 31 and extending from wall to wall of the two radial partitions 11 bounding the sides of the compartments. The cells are aligned from compartment to compartment so as to form concentric rings around the rotor axis. With this arrangement cold air or hot gases flowing in a direction axially of the rotor are caused to pass not only upwardly or downwardly but in a general radial direction to flow through the perforate side walls of the cells and contact the masses of pellets carried thereby. The side wall members 33 of the cells 32 may be in the form of perforated or reticulated plates or may be constructed of screen cloth, of metal or other material suitable for the intended use. From the above it will be seen that when the apparatus functions as an air heater, the heat of the hot gases is imparted to the pellets making up the mass as the gases pass over the pellets through the interstices. Upon rotation of the rotor to place compartments that have been traversed by hot gases in the air passage, the cold air flowing over the heated pellets picks up the heat therefrom so that the air becomes heated. As an alternative use the apparatus may function for the regeneration of catalytic or other material in which case the pellets would be of special chemical composition suitable to the process involved.

In addition to providing cell-like masses of regenerative material that may readily be removed from and replaced in the rotor cartridge-like, the utilization of foraminous containers for the pellets and their disposition in the rotor results in providing a large frontal area for contact by the gases while the masses are individually of small depth so that draft loss in flow through the apparatus is minimized.

In the form of apparatus illustrated in Fig. 4 the arrangement is such that gaseous fluids entering the apparatus in an axial direction flow radially from the side of the apparatus and vice versa. In short, the flow of the fluids through the apparatus is partly in a radial direction and partly in an axial direction. In this construction the rotor shell 10 which defines the outer end of the sector-shaped compartments is formed with a series of openings 40 seperated axially of the rotor by imperforate parts 41. The openings 40 admit the hot gases, for example, to the spaces 42 between the masses or beds 44 of pellets supported between screens 45 and imperforate plates. In this arrangement the pellets are carried in wedge-shaped containers fitting in the rotor compartments between the partitions 11 so as to form several annular layers spaced axially of the rotor with respect to each other. Here the cell masses are spaced axially rather than radially as in the form shown in Figs. 1 to 3. The spaces between axially separated masses 44 are closed at the inner ends of the intervening spaces 42 by plates 46 bent to circular form and supported from the rotor post by spiders 48. In this form also a large frontal area is present for the contact of gases while at the same time the masses of pellets are of small depth.

What I claim is:

1. An air preheater or like apparatus having a cylindrical rotor interiorly divided into wedge or sector-shaped compartments by radial partitions extending to the rotor shell from its axis of rotation, and an enclosing housing provided with paired inlet and outlet ducts for the flow of different fluids over material carried in said compartments; a plurality of closed ended cells for containing discrete material disposed in the compartments of the rotor and axially spaced in each compartment and wedge shaped to fit each in the latter from the rotor shell with their inner ends spaced from its axis of rotation to provide axial passages, said cells being aligned circumferentially from compartment to compartment to provide a plurality of layers of material spaced axially of the rotor with the intervening spaces in the path of fluid flow from inlet to outlet.

2. In contact apparatus for gaseous fluids as recited in claim 1 wherein the inlet duct for one fluid and the outlet duct for the other fluid are connected to said housing for radial flow of fluid to or from the rotor and the other ducts are connected for flow in an axial direction.

3. A gaseous fluid contact apparatus as recited in claim 2 wherein the rotor shell is apertured at the outer end of each compartment in the intervals between circumferential layers of cells in locations to align with said radially connected ducts for the admission and discharge of fluids through the rotor shell.

References Cited in the file of this patent

UNITED STATES PATENTS

| Number | Name | Date |
|---|---|---|
| 1,871,166 | Fahrbach | Aug. 9, 1932 |
| 2,023,965 | Lysholm | Dec. 10, 1935 |
| 2,438,851 | Gates | Mar. 30, 1948 |

FOREIGN PATENTS

| Number | Country | Date |
|---|---|---|
| 162,250 | Great Britain | July 22, 1922 |
| 654,935 | France | Apr. 12, 1929 |